US012420577B2

(12) United States Patent
Nishimura

(10) Patent No.: US 12,420,577 B2
(45) Date of Patent: Sep. 23, 2025

(54) PRINTER

(71) Applicant: TOSHIBA TEC KABUSHIKI KAISHA, Tokyo (JP)

(72) Inventor: Yosuke Nishimura, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 196 days.

(21) Appl. No.: 18/153,212

(22) Filed: Jan. 11, 2023

(65) Prior Publication Data

US 2024/0227424 A1 Jul. 11, 2024

(51) Int. Cl.
*B41J 35/08* (2006.01)
*B41J 2/325* (2006.01)

(52) U.S. Cl.
CPC ............... *B41J 35/08* (2013.01); *B41J 2/325* (2013.01)

(58) Field of Classification Search
CPC ... B41J 35/08; B41J 2/325; B41J 33/00; B41J 33/14; B41J 33/16; B41J 33/18; B41J 33/20; B41J 33/22; B41J 33/24; B41J 33/26; B41J 33/28
See application file for complete search history.

(56) References Cited

U.S. PATENT DOCUMENTS 10,647,139 B1 * 5/2020 Kitahara .................. B41J 33/24

FOREIGN PATENT DOCUMENTS

| | | | |
|---|---|---|---|
| JP | S648076 | A | 1/1989 |
| JP | 2004-299283 | A | 10/2004 |
| JP | 2009-255458 | A | 11/2009 |
| JP | 2021-147189 | A | 9/2021 |

* cited by examiner

*Primary Examiner* — Kristal Feggins
(74) *Attorney, Agent, or Firm* — FOLEY & LARDNER LLP

(57) ABSTRACT

A printer includes a supply-side roll, a winding roller, a detector, a printing assembly, a conveying roller, and an adjuster. The supply-side roll is formed by winding an ink ribbon around a delivery roller. The winding roller winds the ink ribbon. The detector detects a change in tension of the ink ribbon. The printing assembly prints on a printing medium via the ink ribbon stretched between the supply-side roll and a collection-side roll formed by winding the ink ribbon. The conveying roller winds the ink ribbon and rotates in a direction in which the ink ribbon is wound by the winding roller. The adjuster adjusts, based on the change in the tension of the ink ribbon, a frictional force applied between the conveying roller and the ink ribbon and keeps constant tension of the ink ribbon passing through the printing assembly.

13 Claims, 4 Drawing Sheets

PRINTER

FIELD

Embodiments described herein relate generally to, for example, a printer that prints on a printing medium using an ink ribbon.

BACKGROUND

A ribbon transfer-type printer lays an ink ribbon and a printing medium one on top of the other, conveys the ink ribbon and the printing medium between and through a thermal head and a platen roller, and transfers ink of the ink ribbon onto the printing medium. The printer includes a torque limiter in a winding shaft in order to wind the ink ribbon at constant torque. The diameter of a collection roll formed by winding the ink ribbon with the winding shaft increases over time. Therefore, as the diameter of the collection roll increases, the tension of the ink ribbon between the thermal head and the collection roll decreases and is likely to adversely affect printing quality.

DETAILED DESCRIPTION

Figure 1:
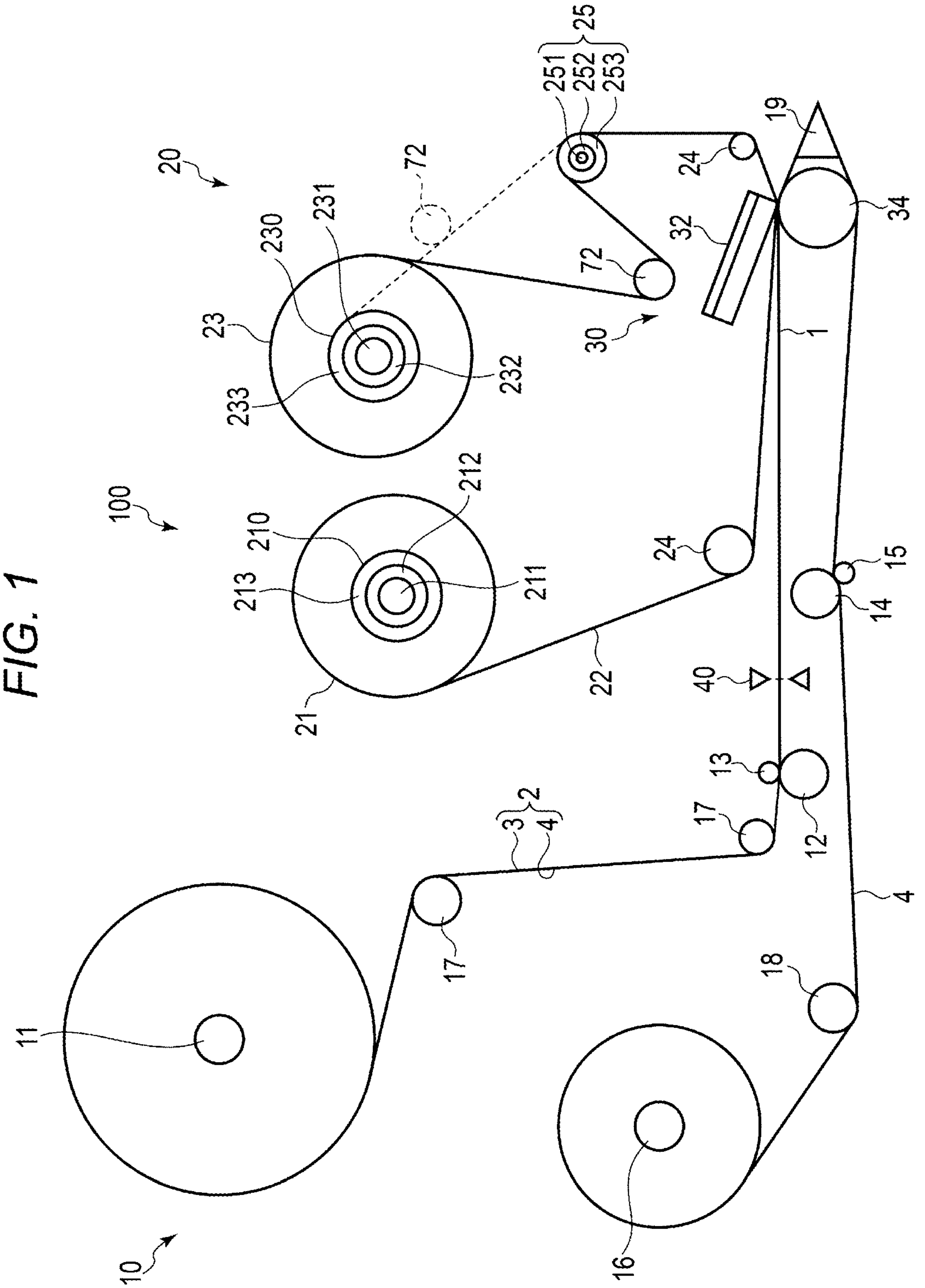
FIG. 1 is a schematic diagram illustrating a printer.

A printer according to an embodiment includes a supply-side roll, a winding roller, a detecting unit (a detector), a printing unit (a printer assembly), a conveying roller, and an adjusting unit (an adjuster, an adjuster assembly, an adjuster mechanism). The supply-side roll is formed by winding an ink ribbon around a delivery roller. The winding roller winds the ink ribbon delivered from the supply-side roll. The detecting unit detects a change in tension of the ink ribbon wound by the winding roller. The printing unit prints on a printing medium via the ink ribbon stretched between the supply-side roll and a collection-side roll formed by winding the ink ribbon with the winding roller. The conveying roller winds the ink ribbon present between the collection-side roll and the printing unit and rotates in a direction in which the ink ribbon is wound by the winding roller. The adjusting unit adjusts, based on a detection result in the detecting unit, a frictional force applied between the conveying roller and the ink ribbon and keeps constant tension of the ink ribbon passing through the printing unit.

A printer 100 according to the embodiment is explained below with reference to the drawings. In the drawings referred to in the following explanation of the embodiment, scales of units are sometimes changed as appropriate. In the drawings referred to in the following explanation of the embodiment, components are sometimes omitted in order to facilitate understanding of the explanation.

As illustrated in FIG. 1, the printer 100 includes a label conveying unit 10 (a label conveyor, a label conveying assembly), a ribbon conveying unit 20 (a ribbon conveyor, a ribbon conveying assembly), and a printing unit 30 (a printer). The label conveying unit 10 conveys label paper 2 via a conveying path 1. The ribbon conveying unit 20 conveys an ink ribbon 22 while laying the ink ribbon 22 on the label paper 2. The printing unit 30 prints on a label 3 on the label paper 2 via the ink ribbon 22. The printer 100 includes a not-illustrated frame (or housing) to which the label conveying unit 10, the ribbon conveying unit 20, and the printing unit 30 are attached in a predetermined positional relation.

The label paper 2 is obtained by pasting a plurality of rectangular labels 3 to one surface of a long belt-like mount 4 at equal intervals with gaps of approximately 1 mm to 3 mm interposed therebetween. The label 3 has constant length in the longitudinal direction of the mount 4. The label 3 has width slightly shorter than width orthogonal to the longitudinal direction of the mount 4. The label 3 includes an adhesive layer on a bonding surface between the label 3 and the mount 4 in order to enable the label 3 to be peeled from the mount 4 and enable the label 3 to be pasted to other objects. The label 3 is an example of the printing medium described in the claims of this application.

The label conveying unit 10 includes a delivery roller 11 on which the label paper 2 is wound in a roll shape, a winding roller 16 that winds, in a roll shape, the mount 4 from which the label 3 of the label paper 2 drawn out from the delivery roller 11 was peeled, and a peeling guide 19.

The label conveying unit 10 includes a capstan roller 12 on the illustrated lower surface side of the conveying path 1 between the delivery roller 11 and the printing unit 30, that is, on the rear surface side of the mount 4 of the label paper 2 conveyed on the conveying path 1. A pinch roller 13 is present in a position opposite to the capstan roller 12 across the conveying path 1, that is, on the label 3 side. The pinch roller 13 is pressed against the capstan roller 12 across the label paper 2 by a not-illustrated spring or the like. The capstan roller 12 rotates in the clockwise direction in FIG. 1 and draws out from the delivery roller 11, the label paper 2 held between the capstan roller 12 and the pinch roller 13.

The label conveying unit 10 includes, between the printing unit 30 and the winding roller 16, a peeling roller 14 that conveys the mount 4 from which the label 3 was peeled by the peeling guide 19. A pinch roller 15 is present in a position opposite the peeling roller 14 across the mount 4. The pinch roller 15 is pressed against the peeling roller 14 across mount 4 by a not-illustrated spring or the like. The peeling roller 14 rotates in the clockwise direction in FIG. 1 and conveys, toward the winding roller 16, the mount 4 turned back by the peeling guide 19 explained below.

The peeling guide 19 is present on the illustrated right side of a platen roller 34, that is, the opposite side of the capstan roller 12 and the peeling roller 14 with respect to the platen roller 34. A frame of the printer 100 fixes the peeling guide 19. The peeling guide 19 has an acute corner portion. The peeling guide 19 brings the corner portion into slide-contact with a surface opposite to a label pasting surface of the label paper 2 drawn out by the capstan roller 12 and turns back the label paper 2 in the opposite direction (the illustrated left direction) at approximately 180°.

The peeling guide 19 peels the label 3 from the mount 4 of the label paper 2 conveyed by the peeling roller 14. The peeling guide 19 peels the label 3 from the mount 4 with stiffness of the label 3 that resists bending together with the mount 4. A not-illustrated label processing device that receives and processes the label 3 peeled from the mount 4 is present near the peeling guide 19.

The label conveying unit 10 includes two rollers 17 around which the label paper 2 is stretched between the delivery roller 11 and the capstan roller 12 and one roller 18 around which the mount 4 is stretched between the peeling roller 14 and the winding roller 16. The rollers 17 and 18 rotate following the conveyed label paper 2. The plurality of rollers 11 to 18 of the label conveying unit 10 respectively include not-illustrated rotating shafts extended in a direction perpendicular to the paper surface in FIG. 1. The frame of the printer 100 rotatably supports both ends of the rotating shafts of the plurality of rollers 11 to 18. The frame of the printer 100 also supports a conveying motor 64 (see FIG. 6).

The label conveying unit 10 conveys the label paper 2 via the conveying path 1 in cooperation with the platen roller 34 of the printing unit 30 explained below. The conveying path 1 passes between a thermal head 32 explained below and the platen roller 34 of the printing unit 30. The platen roller 34 of the printing unit 30 can apply a conveying force to the label paper 2. The label conveying unit 10 conveys the label paper 2 in a direction in which a surface to which the label 3 is pasted of the mount 4 is opposed to the thermal head 32 of the printing unit 30.

The printer 100 includes a sensor 40 positioned along (e.g., halfway) the conveying path 1 on the upstream side of the printing unit 30 in a conveying direction of the label paper 2. The sensor 40 detects a gap between two labels 3 adjacent to each other in the conveying direction of the label paper 2 conveyed by the label conveying unit 10. The sensor 40 is, for example, a transmission sensor including a light emitting unit and a light receiving unit disposed across the conveying path 1. The sensor 40 is present in a position where light made incident on the light receiving unit from the light emitting unit crosses the conveying path 1 between the capstan roller 12 and the printing unit 30. The sensor 40 measures the intensity of the light transmitted through the label paper 2 conveyed on the conveying path 1 and detects a peak of the intensity as the center of a portion of only the mount 4 (the center of a gap) present between two consecutive labels 3.

The ribbon conveying unit 20 includes a supply-side roll 21 formed by winding the long ink ribbon 22 around a delivery roller 210 and a collection-side roll 23 formed by winding, with a winding roller 230, a used ink ribbon 22 passed through the printing unit 30. The ink ribbon 22 stretched between the supply-side roll 21 and the collection-side roll 23 passes between the thermal head 32 and the platen roller 34 of the printing unit 30 to sequentially overlap a plurality of labels 3 of the label paper 2 conveyed on the conveying path 1. The label paper 2 and the ink ribbon 22 are conveyed at the same conveying speed in the same direction and pass through the printing unit 30.

The ribbon conveying unit 20 includes two rollers 24 around which the ink ribbon 22 is stretched and a conveying roller 25 that applies a conveying force to the ink ribbon 22. The conveying roller 25 winds the ink ribbon 22 present between the collection-side roll 23 and the printing unit 30 and rotates in a direction in which the ink ribbon 22 is wound by the winding roller 230. The conveying roller 25 can change, by changing a winding amount of the ink ribbon 22, the conveying force applied to the ink ribbon 22.

The two rollers 24 of the ribbon conveying unit 20 include rotating shafts extended in the direction perpendicular to the paper surface in FIG. 1. The delivery roller 210 includes a driving shaft 211 extended in the direction perpendicular to the paper surface in FIG. 1 and an outer-side roller 213 provided in the driving shaft 211 via a torque limiter 212. The winding roller 230 includes a driving shaft 231 extended in the direction perpendicular to the paper surface in FIG. 1 and an outer-side roller 233 provided in the driving shaft 231 via a torque limiter 232. The torque limiter 232 of the winding roller 230 is an example of the first torque limiter described in the claims of this application. The conveying roller 25 includes a driving shaft 251 extended in the direction perpendicular to the paper surface in FIG. 1 and an outer-side roller 253 provided in the driving shaft 251 via a torque limiter 252. The torque limiter 252 of the conveying roller 25 is an example of the second torque limiter described in the claims of this application.

The frame of the printer 100 rotatably supports both ends of the rotating shafts of the two rollers 24. The frame of the printer 100 rotatably supports both ends of the driving shaft 211 of the delivery roller 210, both ends of the driving shaft 231 of the winding roller 230, and both ends of the driving shaft 251 of the conveying roller 25. The frame of the printer 100 supports a ribbon motor 65 (see FIG. 6).

The ribbon motor 65 rotates the driving shaft 211 of the delivery roller 210, the driving shaft 231 of the winding roller 230, and the driving shaft 251 of the conveying roller 25. A plurality of pulleys and a timing belt are present between the ribbon motor 65 and the driving shafts 211, 231, and 251. The ribbon motor 65 rotates the delivery roller 210, the winding roller 230, and the conveying roller 25 in synchronization with one another.

The torque limiter 232 of the winding roller 230 reduces torque for rotating the outer-side roller 233 to less than a predetermined torque (first torque) and limits torque applied to outer-side roller 233 from the ribbon motor 65 to be constant. The torque applied to the driving shaft 231 by the ribbon motor 65 is the first torque or more. Similarly, the torque limiter 252 of the conveying roller 25 reduces torque for rotating the outer-side roller 253 to less than a predetermined torque (second torque) and limits torque applied to the outer-side roller 253 from the ribbon motor 65 to be constant. The torque applied to the driving shaft 251 by the ribbon motor 65 is the second torque or more.

The ribbon conveying unit 20 includes an adjusting mechanism that adjusts a winding amount of the ink ribbon 22 around the conveying roller 25. Adjusting mechanisms in several embodiments are explained.

Figure 2:
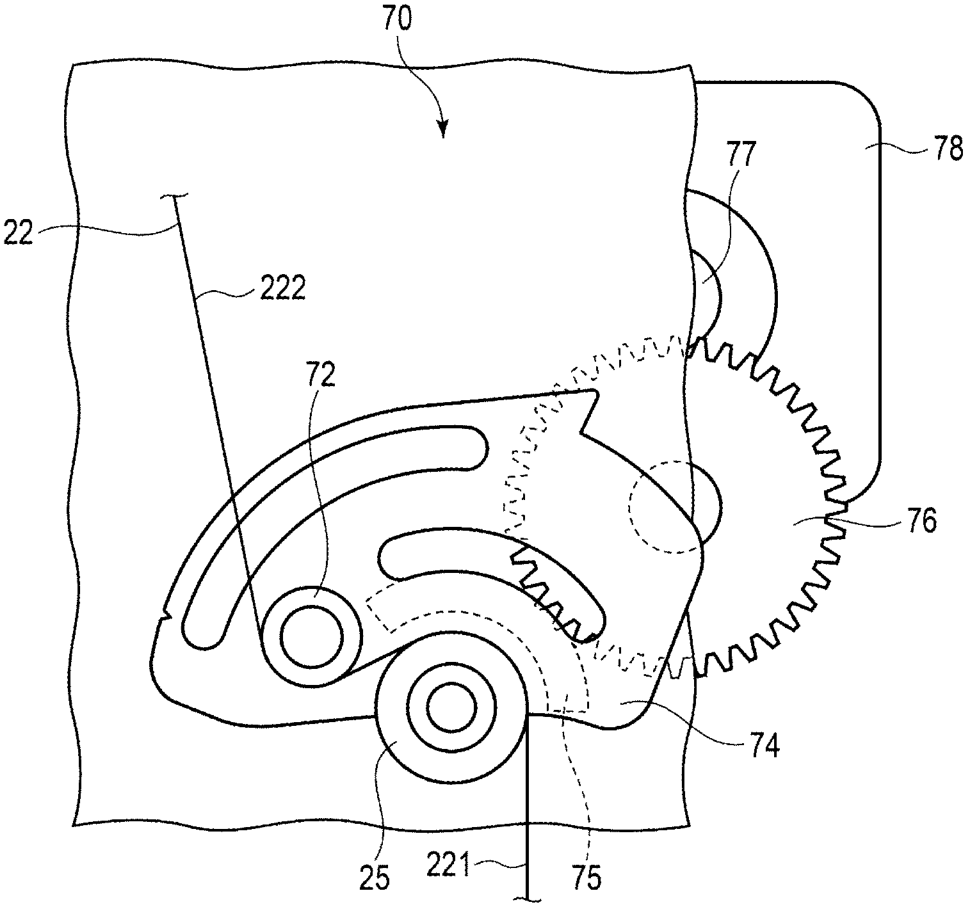
FIG. 2 is a schematic diagram illustrating an adjusting mechanism for an ink ribbon in a first embodiment.
Figure 3:
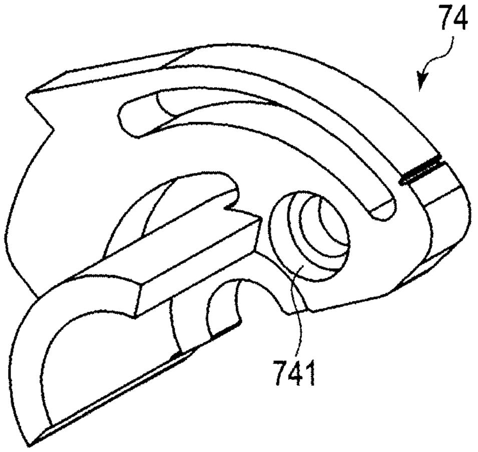
FIG. 3 is a perspective view illustrating a holding member of the adjusting mechanism illustrated in FIG. 2.

As illustrated in FIGS. 1 and 2, an adjusting mechanism 70 according to a first embodiment includes a winding rod 72 for winding the ink ribbon 22 around the conveying roller 25. The winding rod 72 is a columnar rod having an axis perpendicular to the paper surface. The winding rod 72 may be a roller that rotates according to traveling of the ink ribbon 22. The winding rod 72 is present in a position where the winding rod 72 presses the ink ribbon 22 stretched between the conveying roller 25 and the collection-side roll 23. The winding rod 72 is present on the opposite side of the conveying roller 25 across the ink ribbon 22. The winding rod 72 is an example of the winding member described in the claims of this application. The adjusting mechanism 70 includes a holding member 74 (a rod holder) to which the winding rod 72 is fixed and a motor 78 that turns the holding member 74. As illustrated in FIG. 3, the holding member 74 includes or defines an aperture or fixing hole 741 for fixing the winding rod 72.

The winding rod 72 brings the outer circumferential surface of the winding rod 72 into contact with a surface 222 opposite to a surface 221 of the ink ribbon 22 with which the conveying roller 25 is in contact. The adjusting mechanism 70 presses the surface 222 of the ink ribbon 22 with the winding rod 72 and adjusts the winding amount of the ink ribbon 22 around the conveying roller 25. For example, the winding rod 72 is capable of moving between a position indicated by a broken line and a position indicated by a solid line in FIG. 1. The winding amount described in the claims of this application can be represented by an area of a part where the surface 222 of the ink ribbon 22 is in contact with the outer circumferential surface of the outer-side roller 253 of the conveying roller 25. If the winding amount is increased, a frictional force between the outer circumferential surface of the outer-side roller 253 of the conveying roller 25 and the ink ribbon 22 increases. If the winding amount is reduced, the frictional force between the outer circumferential surface of the outer-side roller 253 of the conveying roller 25 and the ink ribbon 22 decreases.

For example, the holding member 74 is capable of turning coaxially with the conveying roller 25. A turning center of the holding member 74 does not always need to be provided coaxially with the conveying roller 25. The fixing hole 741 of the holding member 74 is parallel to a turning axis of the holding member 74. That is, the winding rod 72 is parallel to the turning axis of the holding member 74.

A shape of the holding member 74 is not limited to an illustrated shape and may be any shape. The holding member 74 includes a gear 75 provided coaxially with the conveying roller 25. The gear 75 of the holding member 74 meshes with an idler gear 76. The idler gear 76 meshes with a gear 77 attached to a rotating shaft of the motor 78. That is, a driving force of the motor 78 is transmitted to the holding member 74 via the gear 77, the idler gear 76, and the gear 75. The gear 77, the idler gear 76, and the gear 75 may be referred to as a gear assembly or a geartrain.

If the motor 78 is urged to turn the holding member 74 in the counterclockwise direction in FIG. 2, the winding rod 72 swings in the illustrated counterclockwise direction centering on the conveying roller 25 and moves in a direction in which the winding rod 72 presses the surface 222 of the ink ribbon 22. The direction is a direction in which the winding rod 72 moves from the position indicated by the broken line toward the position indicated by the solid line in FIG. 1.

Since the winding rod 72 presses the surface 222 opposite to the conveying roller 25, if the winding rod 72 swings in the counterclockwise direction, the winding amount of the ink ribbon 22 around the conveying roller 25 increases. Conversely, if the motor 78 is reversely rotated to swing the winding rod 72 in the clockwise direction, the winding amount of the ink ribbon 22 around the conveying roller 25 decreases. The direction is a direction in which the winding rod 72 moves from the position indicated by the solid line toward the position indicated by the broken line in FIG. 1.

Figure 4:
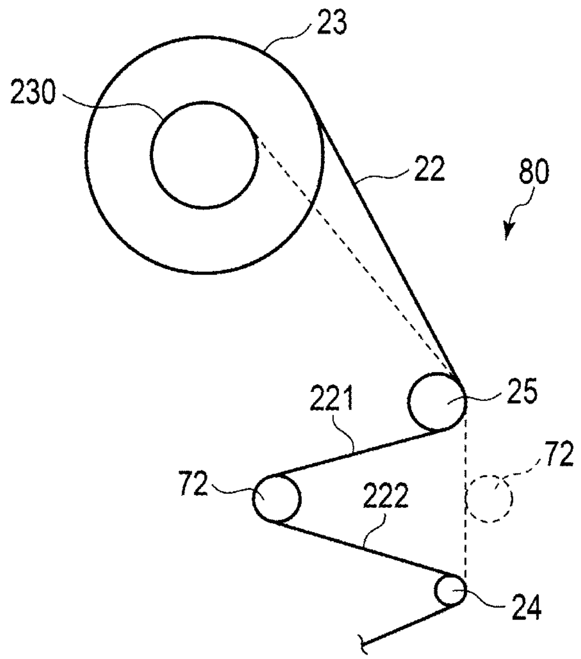
FIG. 4 is a schematic diagram illustrating an adjusting mechanism in a second embodiment.

As illustrated in FIG. 4, an adjusting mechanism 80 according to a second embodiment includes the winding rod 72 in a position where the winding rod 72 pushes in the ink ribbon 22 stretched between the conveying roller 25 and the printing unit 30. As in the first and second embodiments, the winding rod 72 only has to be provided near the conveying roller 25. In this embodiment, the winding rod 72 is disposed in a position where the winding rod 72 pushes in the ink ribbon 22 stretched between the roller 24, which is provided between the conveying roller 25 and the printing unit 30, and the conveying roller 25. The other components are the same as the components in the first embodiment explained above. Therefore, detailed explanation about the components that function in the same manner as in the first embodiment is omitted here.

The adjusting mechanism 80 moves the winding rod 72, for example, from a position indicated by a broken line toward a position indicated by a solid line in FIG. 4 and increases the winding amount of the ink ribbon 22 around the conveying roller 25. The adjusting mechanism 80 moves the winding rod 72, for example, from the position indicated by the solid line toward the position indicated by the broken line and reduces the winding amount of the ink ribbon 22 around the conveying roller 25.

Figure 5:
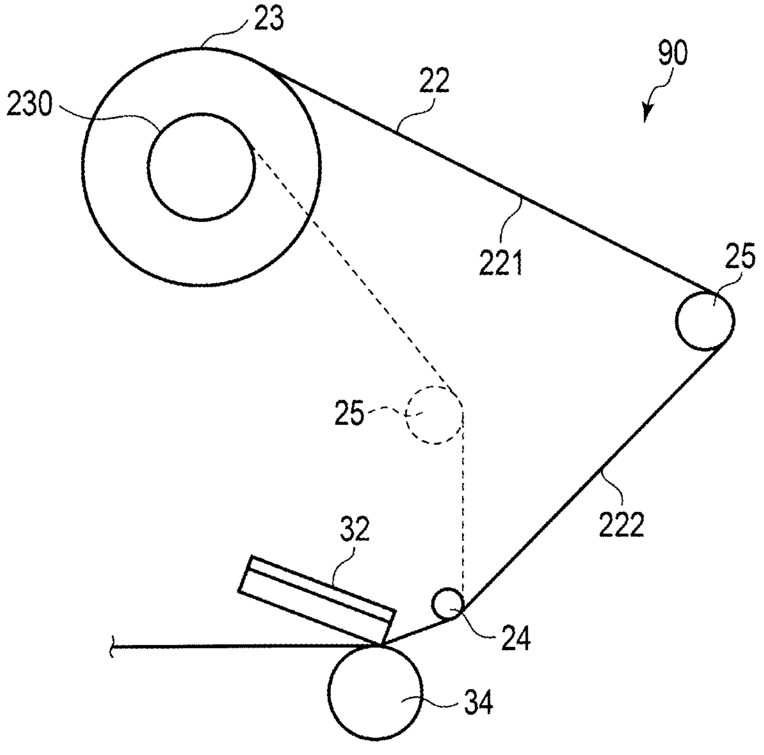
FIG. 5 is a schematic diagram illustrating an adjusting mechanism in a third embodiment.

As illustrated in FIG. 5, an adjusting mechanism 90 according to a third embodiment is different from the adjusting mechanisms 70 and 80 the first and second embodiments explained above in that the adjusting mechanism 90 does not include the winding rod 72. The adjusting mechanism 90 includes a not-illustrated actuator that moves the conveying roller 25, for example, between a position indicated by a broken line and a position indicated by a solid line in FIG. 5. The actuator that moves the conveying roller 25 may be any actuator.

The adjusting mechanism 90 moves the conveying roller 25, for example, from the position indicated by the broken line toward the position indicated by the solid line, moves the conveying roller 25 in a direction in which the conveying roller 25 pushes in the ink ribbon 22, and increases the winding amount of the ink ribbon 22 around the conveying roller 25. The adjusting mechanism 90 moves the conveying roller 25, for example, from the position indicated by the solid line toward the position indicated by the broken line and reduces the winding amount of the ink ribbon 22 around the conveying roller 25.

The adjusting mechanisms 70, 80, and 90 explained above have a purpose of adjusting the winding amount of the ink ribbon 22 around the conveying roller 25 to thereby adjust a frictional force between the conveying roller 25 and the ink ribbon 22. Therefore, an adjusting mechanism may be any adjusting mechanism if the adjusting mechanism can adjust a frictional force between the outer circumferential surface of the conveying roller 25 and the ink ribbon 22. For example, the adjusting mechanism may be an adjusting mechanism in which a pinch roller opposed to the conveying roller 25 via the ink ribbon 22 is provided and a contact pressure of the pinch roller with the conveying roller 25 is made adjustable.

Referring back to FIG. 1, the printing unit 30 includes the thermal head 32 and the platen roller 34. The printing unit 30 includes the thermal head 32 on the rear surface side of the ink ribbon 22, that is, in a position where the label paper 2 and the ink ribbon 22 are held between the thermal head 32 and the platen roller 34. The platen roller 34 is present in a position opposed to the thermal head 32 across the label paper 2 and the ink ribbon 22 that are in an overlapping state.

The thermal head 32 includes a not-illustrated plurality of heat generating elements arranged in the direction perpendicular to the paper surface in FIG. 1. In a state in which the thermal head 32 moves to an illustrated printing position, the thermal head 32 brings the plurality of heat generating elements into contact with the rear surface of the ink ribbon 22 and compresses the ink ribbon 22 and the label paper 2 between the thermal head 32 and the platen roller 34. The platen roller 34 compresses the label paper 2 between the platen roller 34 and the thermal head 32 and rotates to apply a conveying force to the label paper 2. The printing unit 30 presses the ink ribbon 22 against the label paper 2 with the thermal head 32, heats the ink ribbon 22 with the plurality of heat generating elements, and prints on a printing region of the label 3 of the label paper 2.

The printer 100 includes a moving mechanism 36 (see FIG. 6) that separates the thermal head 32 from and brings the thermal head 32 into contact with the platen roller 34. The moving mechanism 36 moves the thermal head 32 between the printing position (the position illustrated in FIG.

1) where the thermal head 32 is pressed against the platen roller 34 and a not-illustrated non-printing position where the thermal head 32 is separated from the ink ribbon 22. If the thermal head 32 is moved to the non-printing position, the thermal head 32 separates from the ink ribbon 22 and force for compressing the label paper 2 and the ink ribbon 22 between the thermal head 32 and the platen roller 34 is not applied. Therefore, in a state in which the thermal head 32 is moved to the non-printing position, the conveying force applied to the label paper 2 from the platen roller 34 is not substantially applied.

Figure 6:
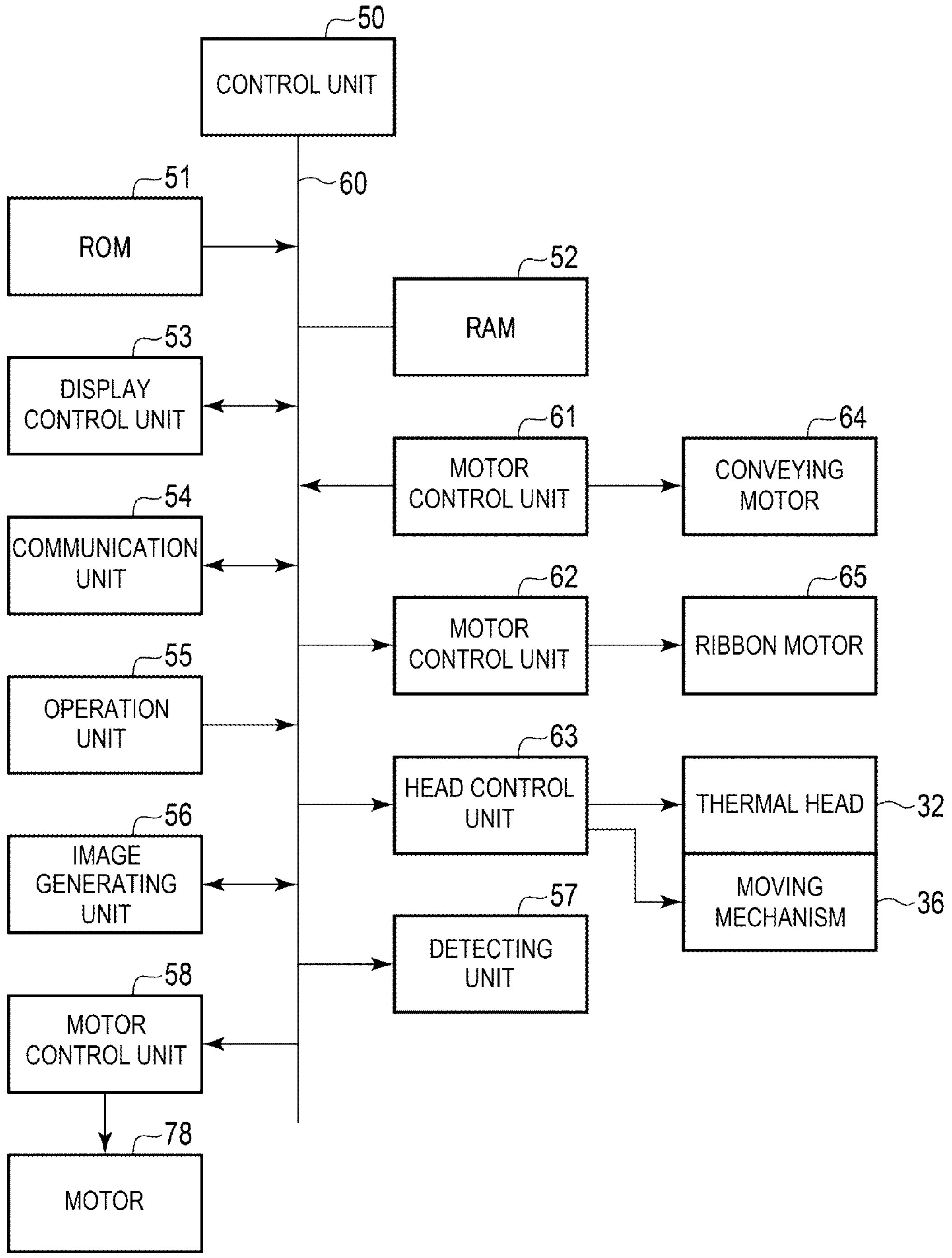
FIG. 6 is a block diagram illustrating a control system of the printer.

As illustrated in FIG. 6, the printer 100 includes a control unit 50 (a controller, a control system), a read-only memory (ROM) 51, a random access memory (RAM) 52, a display control unit 53, a communication unit 54 (a communications interface), an operation unit 55 (an operator interface), an image generating unit 56 (an image generator), a motor control unit 58 (a motor controller), a motor control unit 61(*a* motor controller), a motor control unit 62 (a motor controller), a head control unit 63 (a head controller), a detecting unit 57 (a detector, sensor(s)), the motor 78, the conveying motor 64, the ribbon motor 65, the thermal head 32, and the moving mechanism 36 (an actuator). A bus line 60 communicably connect the control unit 50, the ROM 51, the RAM 52, the display control unit 53, the communication unit 54, the operation unit 55, the image generating unit 56, the motor control unit 58, the motor control unit 61, the motor control unit 62, the head control unit 63, and the detecting unit 57.

The control unit 50 includes a central processing unit (CPU) that controls an operation of the printer 100. The ROM 51 stores operation information, setting information, an operation program, and the like. The RAM 52 stores various kinds of processing information. The display control unit 53 controls a display or display unit present in a not-illustrated control panel of the printer 100. The communication unit 54 communicates with a host computer or the like provided on the outside. The operation unit 55 is present in, for example, the control panel and includes various input keys for an operator to manually input data. The image generating unit 56 draws, in a buffer, printing data to be printed on the label 3 such as a two-dimensional barcode or characters. The communication unit 54 acquires information concerning the printing data as, for example, a printing command from the host computer or the like.

The motor control unit 58 controls the motor 78 of the adjusting mechanism 70 (80). The motor control unit 58 functions as an example of the adjusting unit described in the claims of this application together with the adjusting mechanisms 70, 80, and 90 explained above. The motor control unit 61 controls the conveying motor 64 that drives to rotate the capstan roller 12, the peeling roller 14, and the platen roller 34 of the label conveying unit 10. The conveying motor 64 applies a driving force to the rotating shafts of the three rollers 12, 14, and 34 via a not-illustrated belt and a not-illustrated pulley. That is, the conveying motor 64 rotates the three rollers 12, 14, and 34 in synchronization with one another. The motor control unit 62 controls the ribbon motor 65 that drives to rotate the delivery roller 210, the winding roller 230, and the conveying roller 25.

The head control unit 63 controls the moving mechanism 36 to move the thermal head 32 between the printing position and the non-printing position. The head control unit 63 controls a heat generation state of the heat generating elements of the thermal head 32.

The detecting unit 57 detects the diameter of the collection-side roll 23 of the ribbon conveying unit 20. The detecting unit 57 includes, for example, a plurality of light emitting elements arranged in the radial direction of the collection-side roll 23 and a plurality of light receiving elements opposed to the light emitting elements in the axial direction of the collection-side roll 23. If the diameter of the collection-side roll 23 increases, the number of light receiving elements that stop receiving lights emitted from the light emitting elements increases. The detecting unit 57 detects the diameter of the collection-side roll 23 stepwise based on the number of light receiving elements that stop receiving the lights. The detecting unit 57 may be any detecting unit if the detecting unit can detect the diameter of the collection-side roll 23.

The detecting unit 57 detects the diameter of the collection-side roll 23 to detect a change in the tension of the ink ribbon 22 wound by the wining roller 230. That is, since the winding roller 230 is limited to the constant torque by the torque limiter 232, if the diameter of the collection-side roll 23 increases over time according to the winding of the used ink ribbon 22, the tension of the ink ribbon 22 wound by the winding roller 230 decreases. Accordingly, the detecting unit 57 can detect, by detecting the diameter of the collection-side roll 23, a change in the tension of the ink ribbon 22 wound by the winding roller 230.

In other words, the detecting unit 57 may be any detecting unit if the detecting unit can detect a change in the tension of the ink ribbon 22 wound by the winding roller 230. For example, the detecting unit 57 may be a detecting mechanism that directly detects the tension of the ink ribbon 22 wound by the winding roller 230. Alternatively, the detecting unit 57 may be configured to, if a pitch of the labels 3 detected via the sensor 40 of the label conveying unit 10 is longer than a predetermine threshold, detect that a slip occurred between the conveying roller 25 and the ink ribbon 22 and detect that the tension of the ink ribbon 22 wound by the winding roller 230 decreases exceeding a predetermined threshold.

Functions of the ribbon conveying unit 20 explained above are explained below.

The winding roller 230 of the ribbon conveying unit 20 rotates at constant torque such that excessively large tension does not act on the ink ribbon 22 if the ink ribbon 22 is wound. Therefore, the winding roller 230 includes the torque limiter 232. The ribbon motor 65 applies torque larger than the torque limited by the torque limiter 232 to the driving shaft 231 of the winding roller 230.

The conveying roller 25 rotates at constant torque such that the tension of the ink ribbon 22 passing the thermal head 32 of the printing unit 30 is constant. Therefore, the conveying roller 25 includes the torque limiter 252. The ribbon motor 65 applies torque larger than the torque limited by the torque limiter 252 to the driving shaft 251 of the conveying roller 25.

If the used ink ribbon 22 is wound by the winding roller 230, the diameter of the collection-side roll 23 gradually increases. In this embodiment, since the winding roller 230 is rotated at the constant torque, as the diameter of the collection-side roll 23 increases, the tension of the ink ribbon 22 wound by the winding roller 230 decreases.

In this way, if the tension of the ink ribbon 22 decreases, a contact pressure applied to the conveying roller 25 by the ink ribbon 22 wound around the conveying roller 25 decreases and the frictional force between the conveying roller 25 and the ink ribbon 22 decreases. If the frictional force decreases to a degree of causing a slip between the conveying roller 25 and the ink ribbon 22, the tension of the ink ribbon 22 passing the thermal head 32 decreases and printing quality is likely to be adversely affected.

Accordingly, in this embodiment, the frictional force between the conveying roller 25 and the ink ribbon 22 is prevented from decreasing according to the increase in the diameter of the collection-side roll 23. That is, the adjusting mechanism 70 (or the adjustment mechanism 80 or the adjustment mechanism 90) is caused to operate to increase the winding amount of the ink ribbon 22 around the conveying roller 25 before the diameter of the collection-side roll 23 increases exceeding a predetermined threshold and a slip occurs between the conveying roller 25 and the ink ribbon 22. In this case, the threshold of the diameter of the collection-side roll 23 is, for example, a value at which a slip occurs between the conveying roller 25 and the ink ribbon 22 and only has to be measured and stored in the RAM 52 in advance.

As explained above, according to the embodiment explained above, if the diameter of the collection-side roll 23 increases, the frictional force between the conveying roller 25 and the ink ribbon 22 is increased before a slip occurs between the conveying roller 25 and the ink ribbon 22. Therefore, it is possible to keep constant the tension of the ink ribbon 22 passing the thermal head 32 and satisfactorily keep printing quality.

According to this embodiment, the winding amount of the ink ribbon 22 around the conveying roller 25 is reduced in a state in which the diameter of the collection-side roll 23 is small and the tension of the ink ribbon 22 wound by the winding roller 230 is sufficiently large. Therefore, it is possible to suppress a deficiency in which the tension of the ink ribbon 22 is too strong and creases occur in the ink ribbon 22.

While certain embodiment have been described, this embodiment has been presented by way of example only, and is not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

The invention claimed is:

1. A printer comprising:

a supply-side roll formed by winding an ink ribbon around a delivery roller;

a winding roller configured to wind the ink ribbon delivered from the supply-side roll;

a detector configured to detect a change in tension of the ink ribbon wound by the winding roller;

a printing assembly configured to print on a printing medium via the ink ribbon stretched between the supply-side roll and a collection-side roll formed by winding the ink ribbon with the winding roller;

a conveying roller configured to wind the ink ribbon present between the collection-side roll and the printing assembly, and rotate in a direction in which the ink ribbon is wound by the winding roller; and an adjuster including a gear assembly, the adjuster configured to adjust, based on the change in the tension of the ink ribbon, a frictional force applied between the conveying roller and the ink ribbon and keep constant tension of the ink ribbon passing through the printing assembly.

2. The printer according to claim 1, further comprising a conveying assembly configured to convey the printing medium through the printing assembly.

3. The printer according to claim 1, wherein the adjuster includes a motor, a rod positioned to variably engage the ink ribbon, and a holder defining an aperture that receives the rod, and wherein the gear assembly is positioned between the motor and the holder.

4. The printer according to claim 3, wherein the motor is configured to drive the gear assembly to reposition the holder and, thereby, reposition the rod and, therefore, adjust the tension of the ink ribbon.

5. A printer comprising:

a supply-side roll formed by winding an ink ribbon around a delivery roller;

a winding roller configured to wind the ink ribbon delivered from the supply-side roll;

a detector configured to detect a change in tension of the ink ribbon wound by the winding roller;

a printing assembly configured to print on a printing medium via the ink ribbon stretched between the supply-side roll and a collection-side roll formed by winding the ink ribbon with the winding roller;

a conveying roller configured to wind the ink ribbon present between the collection-side roll and the printing assembly, and rotate in a direction in which the ink ribbon is wound by the winding roller;

an adjuster configured to adjust, based on the change in the tension of the ink ribbon, a frictional force applied between the conveying roller and the ink ribbon and keep constant tension of the ink ribbon passing through the printing assembly;

a first torque limiter for limiting torque for rotating the winding roller to a first torque; and a second torque limiter for limiting torque for rotating the conveying roller to a second torque.

6. The printer according to claim 5, wherein the detector is configured to detect a diameter of the collection-side roll.

7. The printer according to claim 6, wherein the adjuster is configured to adjust a winding amount of the ink ribbon around the conveying roller based on the change in the tension of the ink ribbon.

8. The printer according to claim 7, wherein the adjuster includes, near the conveying roller, a winding member that pushes in a surface opposite to a surface of the ink ribbon coming into contact with the conveying roller and increases the winding amount of the ink ribbon around the conveying roller.

9. The printer according to claim 8, wherein the winding member pushes in the ink ribbon stretched between the collection-side roll and the conveying roller and increases the winding amount of the ink ribbon around the conveying roller.

10. The printer according to claim 8, wherein the winding member pushes in the ink ribbon stretched between the conveying roller and the printing assembly and increases the winding amount of the ink ribbon around the conveying roller.

11. The printer according to claim 7, wherein the adjuster is configured to move the conveying roller in a direction for pushing in the ink ribbon and increases the winding amount of the ink ribbon around the conveying roller.

12. A printer comprising:

a supply-side roll configured to receive a roll of ink ribbon;

a winding roller configured to receive the ink ribbon from the supply-side roll;

a conveying assembly configured to convey a printing medium;

a printing assembly configured to receive the printing medium and the ink ribbon; and an adjuster including:

a motor;

a rod positioned to engage the ink ribbon;

a holder defining an aperture that receives the rod; and a gear assembly positioned between the motor and the holder;

wherein the motor is configured to drive the gear assembly to reposition the holder and, thereby, reposition the rod to adjust a tension of the ink ribbon.

13. The printer of claim 12, further comprising:

a sensor positioned to facilitate detecting the tension of the ink ribbon; and a controller configured to control the motor based on the tension.

* * * * *